US008992149B2

(12) United States Patent
Dixon

(10) Patent No.: US 8,992,149 B2
(45) Date of Patent: Mar. 31, 2015

(54) SELF RETAINING ANTI-ROTATION KEY

(75) Inventor: Alan Benjamin Christopher Dixon, Palm Beach Gardens, FL (US)

(73) Assignee: Aerojet Rocketdyne of DE, Inc., Canoga Park, CA (US)

( * ) Notice: Subject to any disclaimer, the term of this patent is extended or adjusted under 35 U.S.C. 154(b) by 733 days.

(21) Appl. No.: 13/223,355

(22) Filed: Sep. 1, 2011

(65) Prior Publication Data

US 2013/0055547 A1 Mar. 7, 2013

(51) Int. Cl.
*F16B 39/06* (2006.01)

(52) U.S. Cl.
CPC .............. *F16B 39/06* (2013.01); *Y10S 411/948* (2013.01)
USPC ............................ 411/322; 411/217; 411/948

(58) Field of Classification Search
CPC ........................................................ F16B 39/06
USPC ......... 411/292, 321, 322, 324, 939, 208, 217, 411/216
See application file for complete search history.

(56) References Cited

U.S. PATENT DOCUMENTS

| | | | | | |
|---|---|---|---|---|---|
| 238,340 | A | * | 3/1881 | Bunker | 411/322 |
| 478,096 | A | * | 7/1892 | Durben | 411/322 |
| 565,827 | A | * | 8/1896 | Bennett | 411/293 |
| 661,923 | A | * | 11/1900 | Spencer | 411/259 |
| 858,889 | A | * | 7/1907 | Morrison | 411/322 |
| 859,789 | A | * | 7/1907 | Vaughn | 411/198 |
| 883,691 | A | * | 4/1908 | Bowman | 411/322 |
| 1,047,542 | A | * | 12/1912 | Lofland | 411/322 |
| 1,108,866 | A | * | 8/1914 | Messner | 411/322 |
| 1,129,787 | A | * | 2/1915 | Bright | 411/322 |
| 2,278,344 | A | * | 3/1942 | Baker | 411/217 |
| 4,902,047 | A | | 2/1990 | Marietta et al. | |
| 5,044,676 | A | | 9/1991 | Burton et al. | |
| 7,146,704 | B2 | | 12/2006 | Otten et al. | |
| 2005/0141982 | A1 | | 6/2005 | Schultz | |

FOREIGN PATENT DOCUMENTS

| | | |
|---|---|---|
| WO | 2008039334 | 4/2008 |

* cited by examiner

*Primary Examiner* — Flemming Saether
(74) *Attorney, Agent, or Firm* — Joel G Landau

(57) ABSTRACT

Anti-rotation keys are typically used in applications where an end of a threaded stud is received in a housing, and where the opposite end of the stud projects from the housing to allow attachment of another component to the housing. Once partially received in the housing, further rotation of the stud is prevented by an anti-rotation key. The disclosed anti-rotation key is self-retaining, in that it prevents itself from "backing out" of the channel due to vibration or thermal expansion of the housing, etc., while also being removable from the channel if desired.

2 Claims, 11 Drawing Sheets

SELF RETAINING ANTI-ROTATION KEY

STATEMENT REGARDING FEDERALLY SPONSORED RESEARCH OR DEVELOPMENT

This disclosure was made with government support under Contract No. 2EB0753 awarded by NASA and ULA (United Launch Alliance). The Government has certain rights in this invention.

BACKGROUND

This disclosure relates to an anti-rotation key, and in particular to a self-retaining anti-rotation key.

Anti-rotation keys are typically used in applications, such as fastener assemblies, where an end of a threaded stud is received in a housing, and where the opposite end of the stud projects from the housing to allow attachment of another component to the housing. Once partially received in the housing, further rotation of the stud is prevented by an anti-rotation key.

BRIEF DESCRIPTION OF THE DRAWINGS

The drawings can be briefly described as follows.

DETAILED DESCRIPTION

Figure 1:
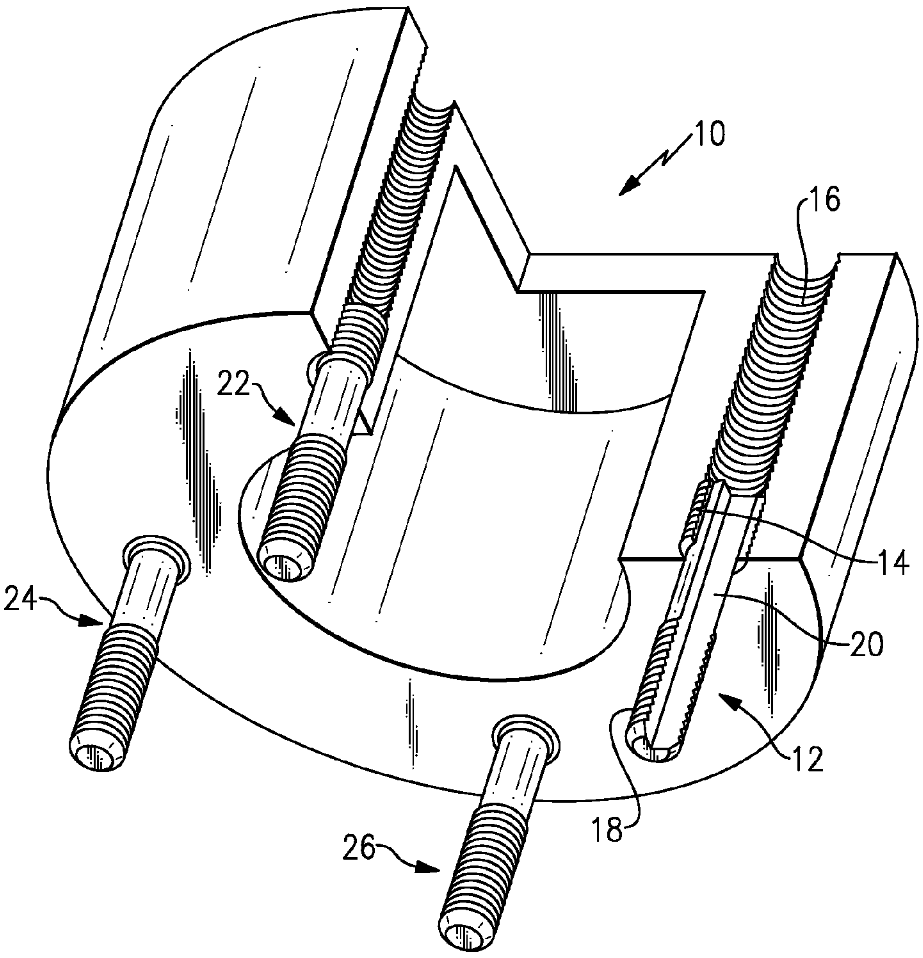
FIG. 1 is a perspective view, including a cut-out, representative of a housing receiving a plurality of studs.

With reference to FIG. 1, anti-rotation keys may be used in applications where a housing 10 partially supports a stud 12. In the example shown, a stud 12 includes a first threaded end 14 received in a threaded opening 16 of the housing 10. A component such as a plate (or housing), for example, may be attached to the housing 10 via the second threaded end 18 of the stud 12. As shown, the second threaded end 18 of the stud 12 projects from the housing 10 by way of an unthreaded shank 20. However, the unthreaded shank 20 need not be present.

The housing 10 can receive any number of studs (e.g., as shown, the housing 10 receives four studs 12, 22, 24, 26), as desired, and would include a corresponding number of openings. In one application, the housing 10 is a portion of a housing for a fuel pump of a rocket engine (e.g., an RL10).

Figure 2C:
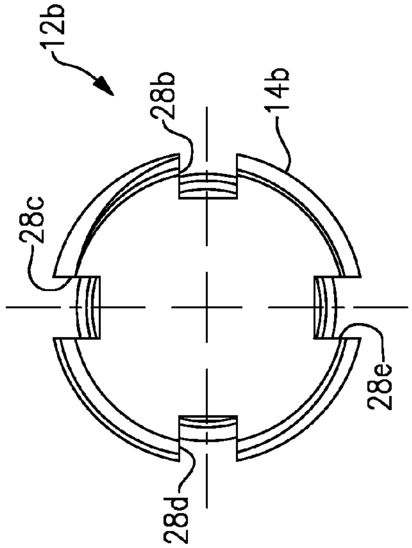
FIG. 2C is a top view of another exemplary stud.
Figure 2B:
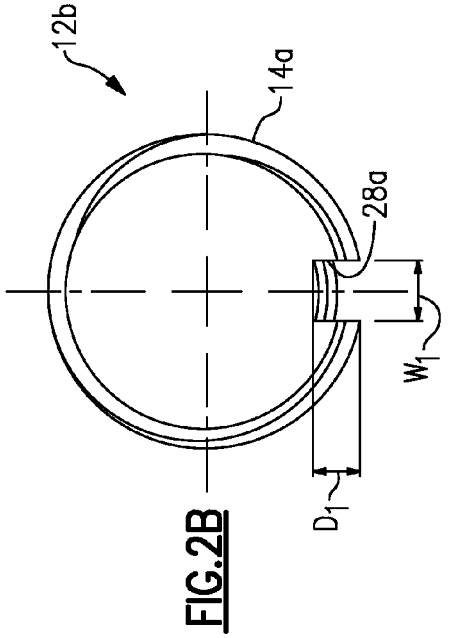
FIG. 2B is a top view of the stud of FIG. 2A.
Figure 2A:
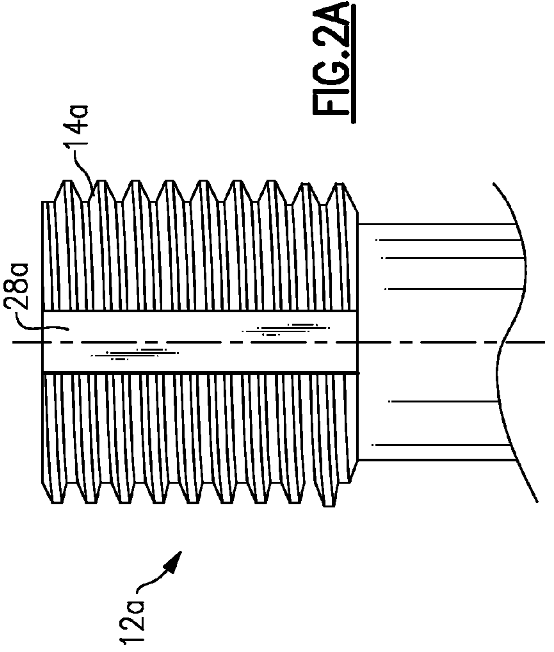
FIG. 2A is a side view of an exemplary stud.

An example stud 12*a* is shown in detail in FIGS. 2A-2B. As shown, the stud 12*a* includes one channel 28*a* formed into its first threaded end 14*a*. As explained below, the channel 28*a* is configured to align with a corresponding channel (e.g., the channel 36 in FIG. 3B) in the threaded opening 16 of the housing 10, and is of a width $W_1$ and depth $D_1$ corresponding to that of the channel in the housing 10. The threaded end 14*a* could include additional channels, as desired, and as represented in FIG. 2C, which shows a top view of another example stud 12*b* including four channels 28*b-e*. A stud 12 including at least one channel can be used with the housing 10 of FIG. 1.

Figure 3B:
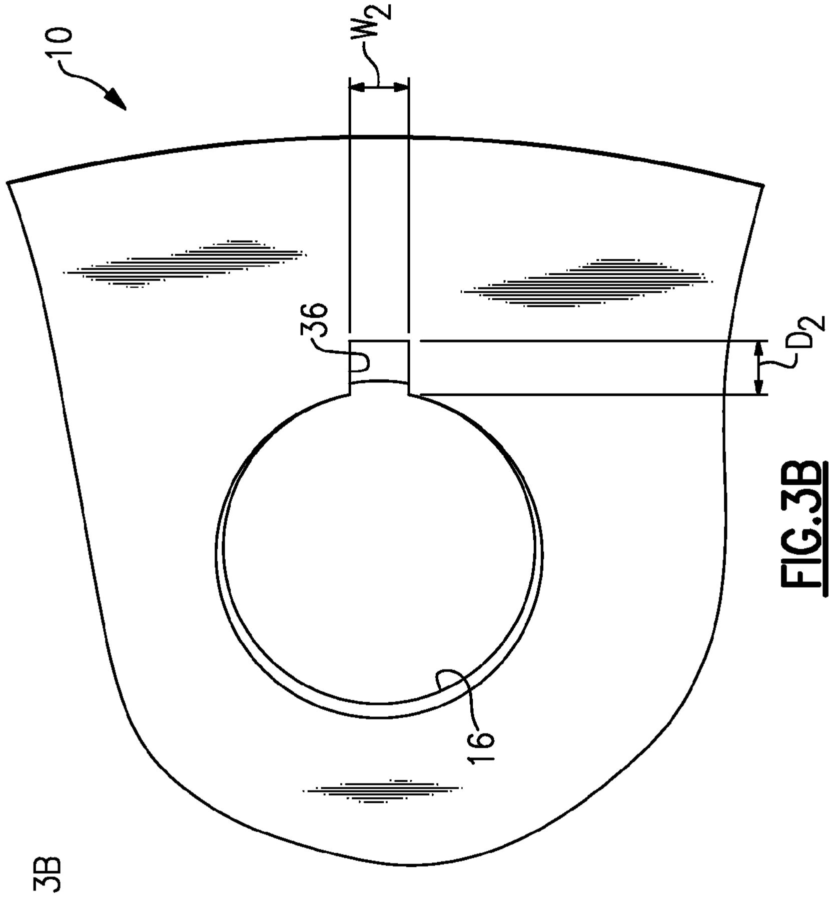
FIG. 3B is a close-up view of area 3B from FIG. 3A.
Figure 3A:
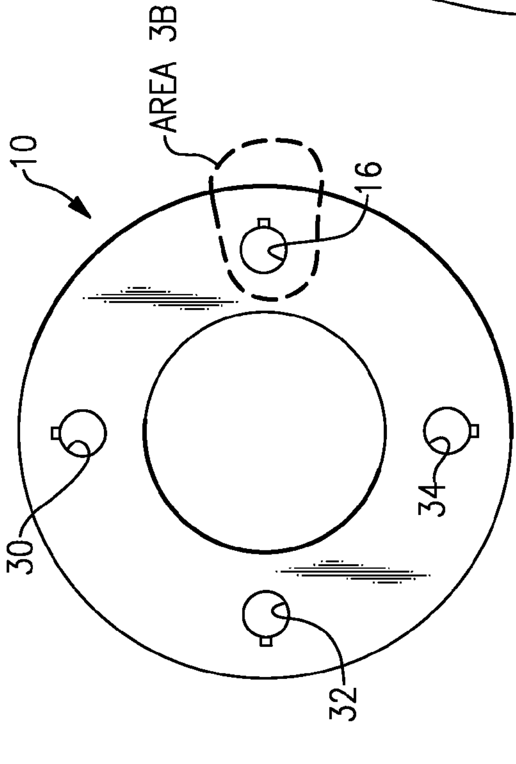
FIG. 3A is a bottom view of an exemplary housing.
Figure 3D:
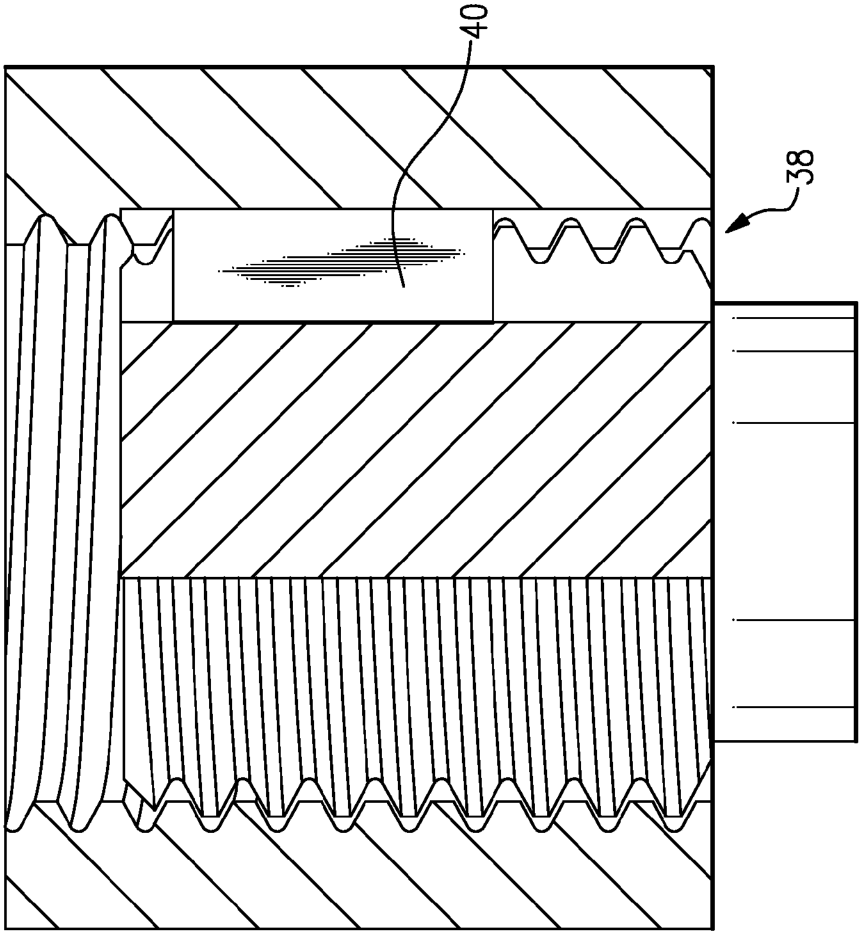
FIG. 3D is a sectional view taken along line A-A, and showing a known anti-rotation key positioned in the key channel.
Figure 3C:
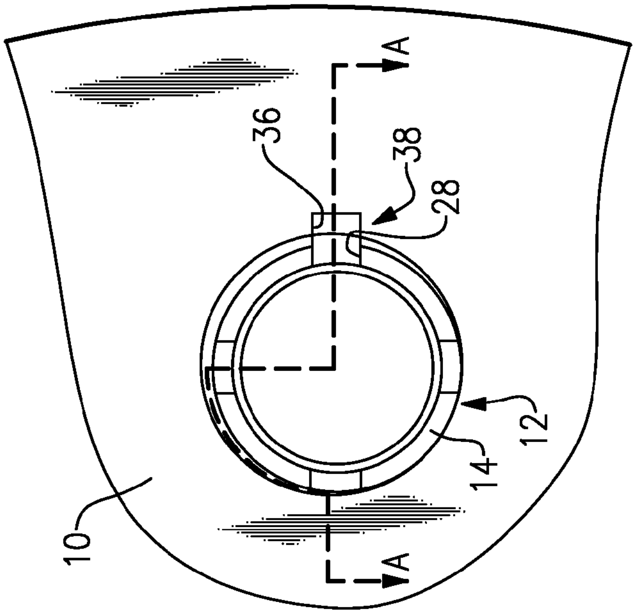
FIG. 3C is a view similar to FIG. 3B, representative of the manner in which the housing may receive the stud.

FIGS. 3A-3B show the housing 10 in further detail. For example, in addition to the threaded opening 16 mentioned above relative to FIG. 1, the housing 10 may include additional threaded openings (e.g., threaded openings 30, 32, 34) to correspond to a selected number of studs. The threaded opening 16, for example, is in communication with a channel 36 having a width $W_2$ and depth $D_2$ corresponding to that of the channel 28 in the stud 12. For example, as shown in FIG. 3C, the channel 28 of the stud 12 and the channel 36 of the housing 10 align to define a key channel 38. As shown in FIG. 3D, a known key 40 has heretofore been press-fit into the channel 38 to prevent rotation of the stud 12 relative to the housing 10.

Figure 4B:
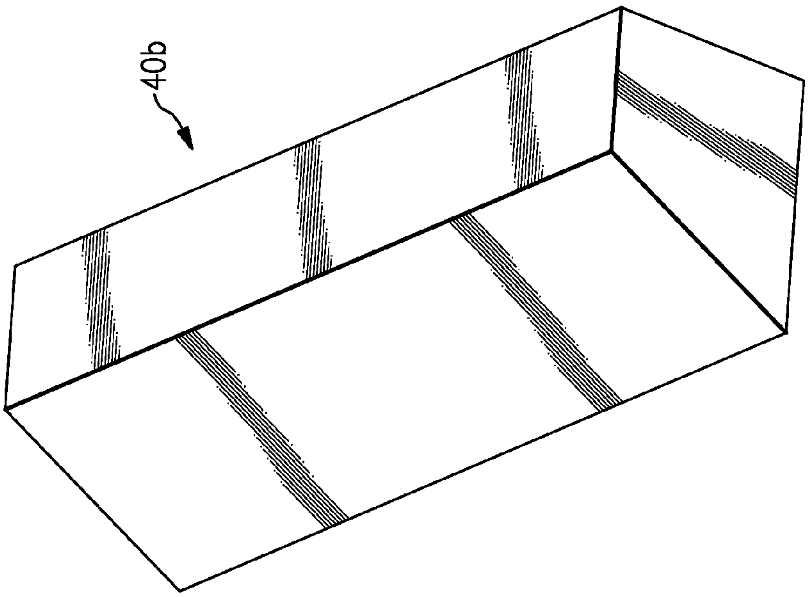
FIGS. 4A-4B are representative of related art anti-rotation keys.
Figure 4A:
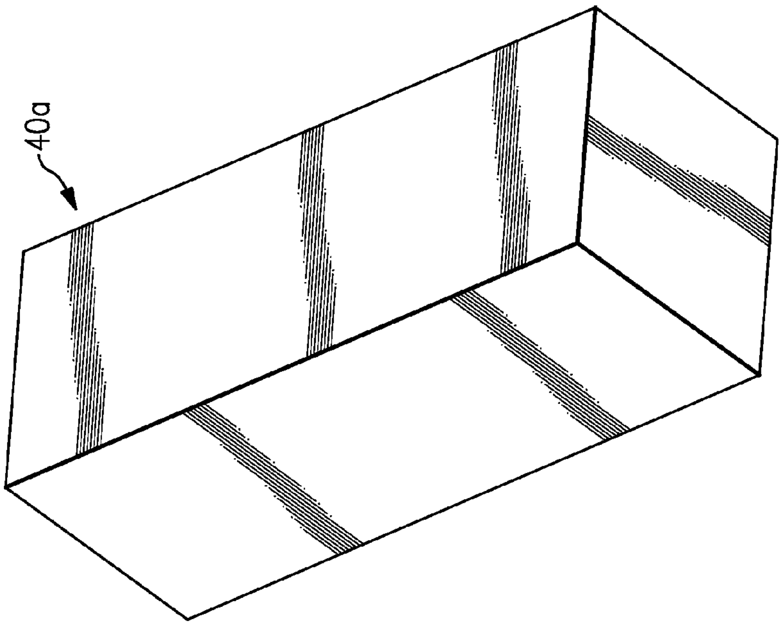

FIGS. 4A-4B show two known keys 40*a*, 40*b*. The keys 40*a*, 40*b* are rectangular and trapezoidal keys, respectively. Again, as represented in FIG. 3D, these keys 40*a*, 40*b* may be press fit into the key channel 38 such that they abut both the channels 28, 36 of the stud 12 and the housing 10, thereby substantially preventing rotation of the stud 12 relative to the housing 10.

Figure 5E:
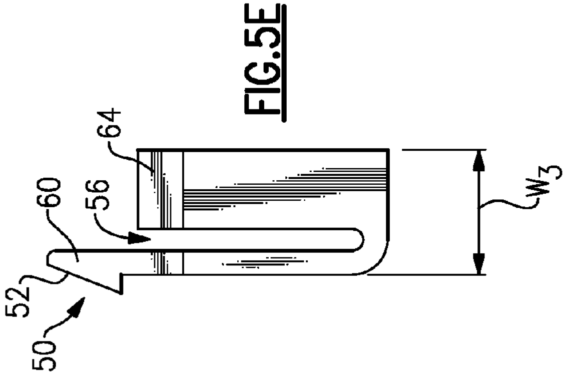
FIGS. 5B-5E are top, front, bottom and side views of the anti-rotation key of FIG. 5A, respectively.
Figure 5B:
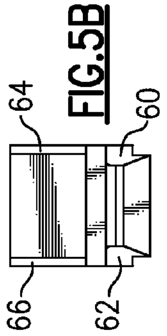
Figure 5C:
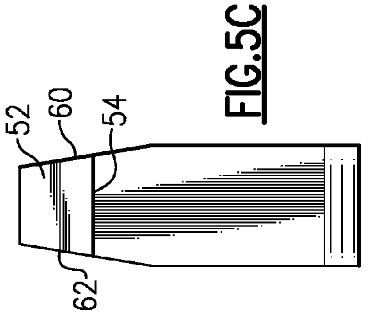
Figure 5D:
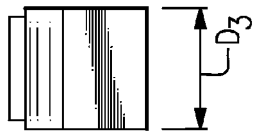
Figure 5A:
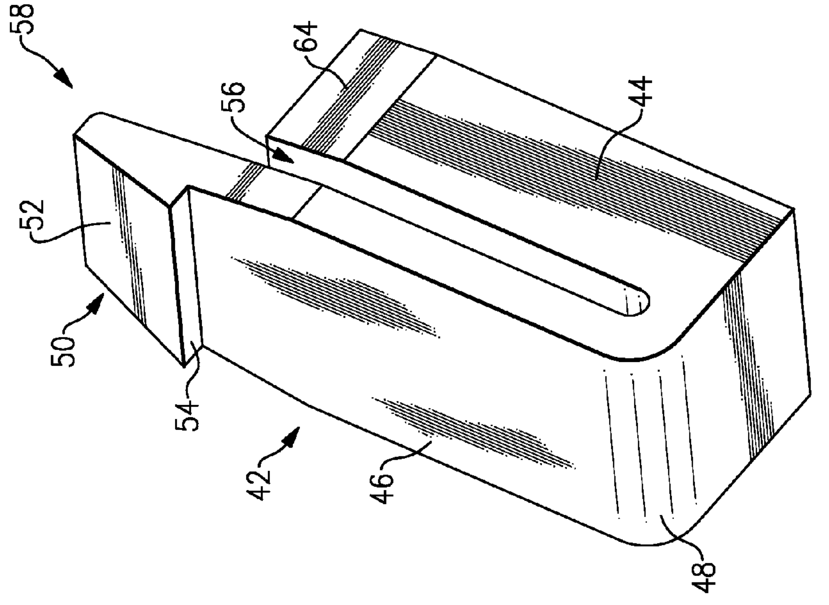
FIG. 5A is a perspective view of one non-limiting embodiment of an anti-rotation key.

An example of an anti-rotation key 42, according to one disclosed non-limiting embodiment of this disclosure, is shown in detail across the various views of FIGS. 5A-5E. With reference to FIG. 5A in particular, the disclosed anti-rotation key 42 includes a main body portion 44 and a flex arm 46 attached thereto by a flex area 48. At an end opposite the flex area 48, the flex arm 46 includes a locking tip 50, which has an angled surface 52 and an abutting face 54. As shown, the abutting face 54 defines a plane generally perpendicular to the flex arm 46. Notably, the flex arm 46 may be attached to the main body portion 44 in a variety of ways including, but not limited to, being integrally attached thereto (e.g., as shown in FIGS. 5A-5E) or being connected thereto after forming. Further, while an angled surface 52 is shown, the locking tip 50 could simply protrude from the flex arm 46 without being angled in this manner.

Figure 6C:
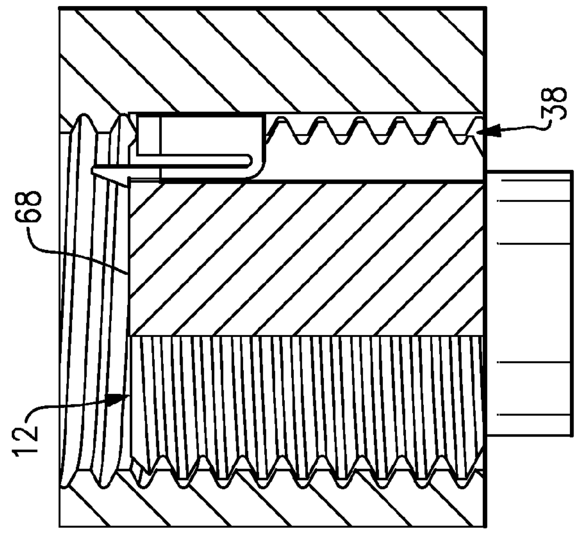
FIG. 6C shows the disclosed anti-rotation key fully inserted, at the end of the key channel.
Figure 6B:
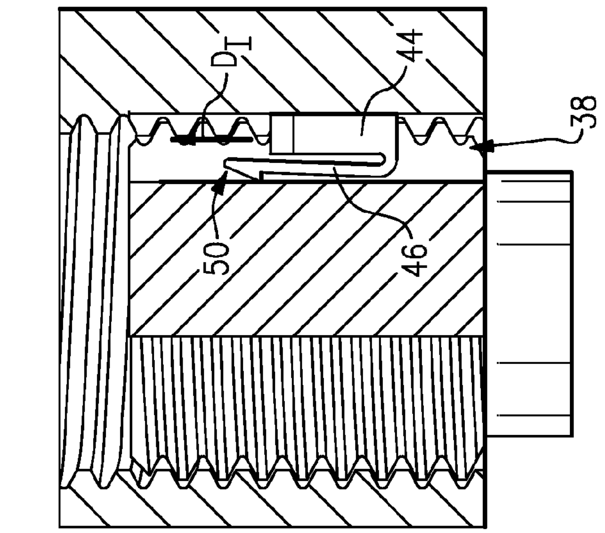
FIGS. 6A-6B represent the manner in which the disclosed anti-rotation key is inserted into, and passes through, the key channel.

The flex arm 46 and the locking tip 50 are deflectable, by virtue of a slot 56, from a relaxed position (shown) toward the main body portion 46 to a deflected position (e.g., see FIG. 6B). The anti-rotation key 42 may be formed in the relaxed position, and of a resilient material, such as steel. Accordingly, the anti-rotation key 42 may be biased toward the relaxed position (e.g., the resiliency of the anti-rotation key 42 urges the flex arm from the deflected position to the relaxed position).

Figure 6A:
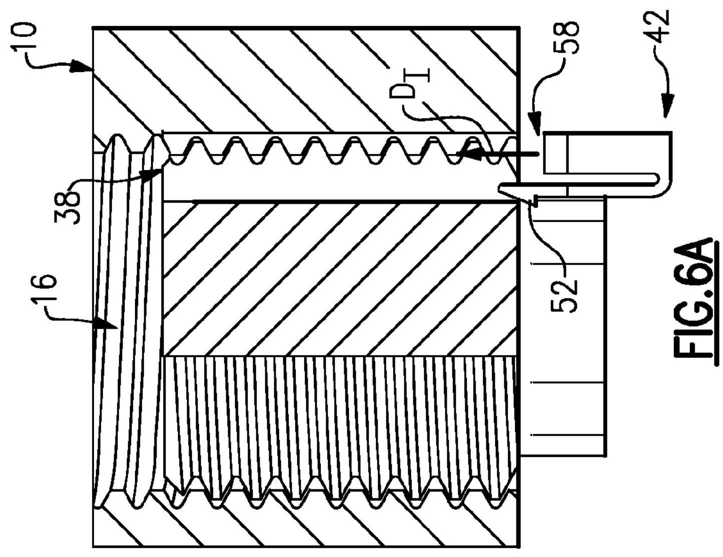

The locking tip 50 may be provided at an insertion end 58 of the anti-rotation key 42, which is the end section of the anti-rotation key 42 that is initially inserted into the key channel 38, as shown in FIG. 6A. The flex arm 46 and the locking tip 50 may thus be provided with tapered surfaces 60, 62 at the insertion end 58 to facilitate insertion of anti-rotation key 40 into the key channel 38. The main body portion 44 may also include tapered surfaces 64, 66 proximate the insertion end 58. Further, the angled surface 52 contributes to ease of insertion into the channel 38.

As shown in FIGS. 5D-5E, the anti-rotation key 42 may be sized to have a depth $D_3$ and width $W_3$ corresponding to the depth and width of the key channel 38 (which is of course dependent on the depths $D_1$ and $D_2$, as well as the widths $W_1$ and $W_2$). Notably, the angled surface 52 of the locking tip 50 extends beyond the depth $D_3$, such that the locking tip 50 and the flex arm 46 deflect toward the main body portion 44 (again, by virtue of the slot 56) when the anti-rotation key 42 is inserted into the key channel 38, as shown in FIG. 6B, and such that the locking tip 50 extends beyond the depth of the channel 38 when fully inserted to the end of the channel 38, as shown in FIG. 6C.

Figure 6D:
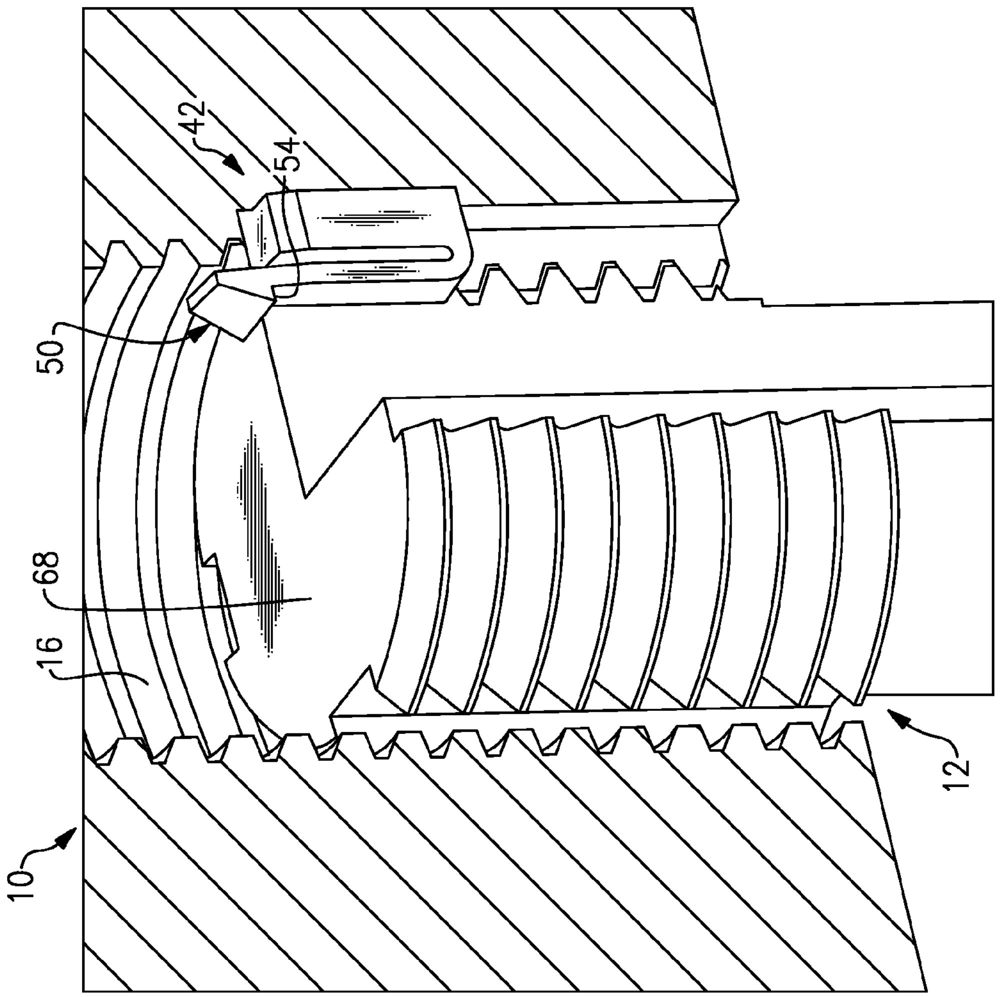
FIG. 6D is a perspective view of FIG. 6C.

FIGS. 6A-6C show the insertion and locking sequence for the anti-rotation key 42 generally described above. Again, the anti-rotation key 42 is inserted into the key channel 38, insertion end 58 first, in an insertion direction $D_I$ along the length of the channel 38. As the anti-rotation key 42 enters the channel 38, the angled surface 52 of the locking tip 50 engages the key channel 38 (e.g., as shown, the channel 28 of the stud) and is deflected to the deflected position, as is generally shown in FIG. 6B. Once the anti-rotation key 42 reaches the end of the channel 38, the locking tip 50 and flex arm 46 return to the relaxed position (or, at least substantially to the relaxed position) and the abutting face 54 is brought into contact with an end surface 68 of the stud 12, as shown in FIGS. 6C-6D. Further, the main body portion 44 engages the channel 38 such that rotation of the stud 12 relative to the housing 10 is substantially prevented.

By virtue of the engagement of the abutting face 54 and the end face 68 of the stud 12, the above-described anti-rotation key 42 is thus self-retaining, and does not "back out" of the channel 38 (e.g., in the removal direction $D_R$) due to vibration or thermal expansion of the housing 10. However, the anti-rotation key 42 can be removed if desired, as explained below.

Figure 7B:
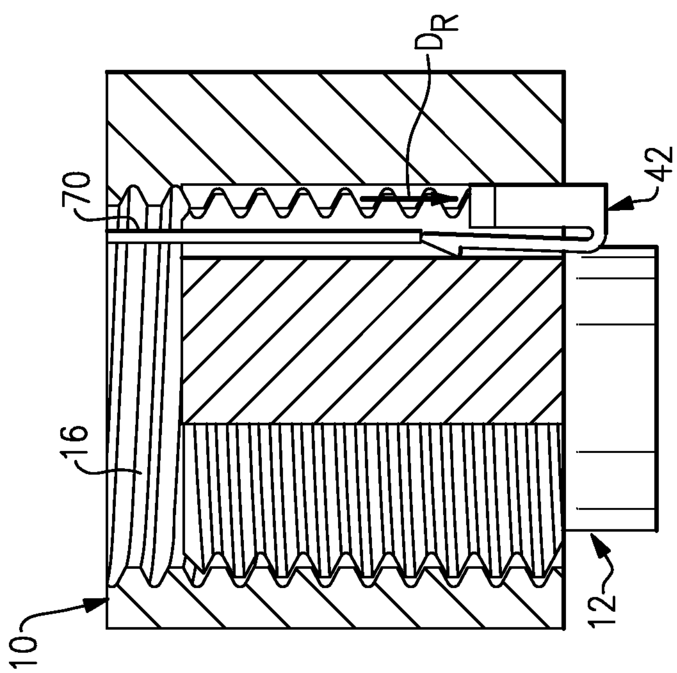
FIGS. 7A-7B are representative of the manner in which the anti-rotation key of FIGS. 5A-5E may be removed from the key channel.
Figure 7A:
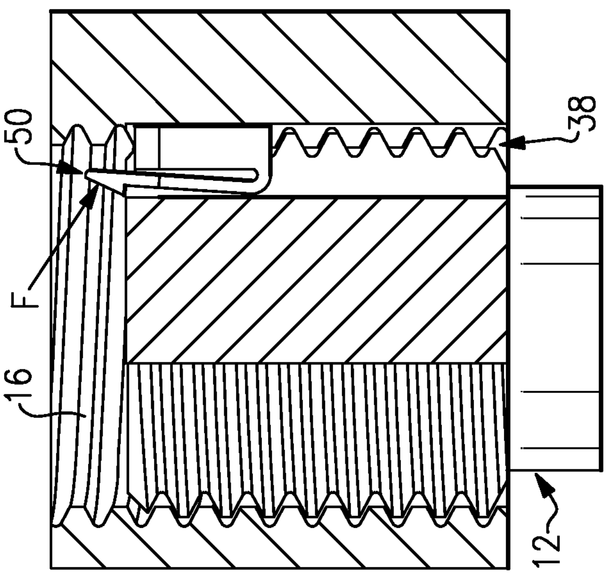

In the event that the stud 12 should need to be removed from the housing 10, the anti-rotation key 42 may be removed from the channel 38 by applying a force F to deflect the locking tip 50 away from the relaxed position and toward the deflected position, and then moving the anti-rotation key 42 in a removal direction $D_R$ along the length of the channel 38, in a direction opposite to the insertion direction $D_I$. A tool 70, such as a screwdriver or other specialized tool, may be used to apply the force F and push the anti-rotation key through the channel 38, as generally represented in FIGS. 7A-7B.

While the above-described anti-rotation key 42 may be removed from the channel 38 by insertion of a removal tool 70 through the top of the threaded opening 16, it may be the case that the disclosed anti-rotation key is used with a blind opening. Accordingly, another example anti-rotation key 142 is disclosed in FIGS. 8A-8B. To the extent not otherwise described or shown, the embodiment of FIGS. 8A-8B corresponds to the embodiment of FIGS. 5A-5B with like parts having reference numerals preappended with a "1."

Figure 8A:
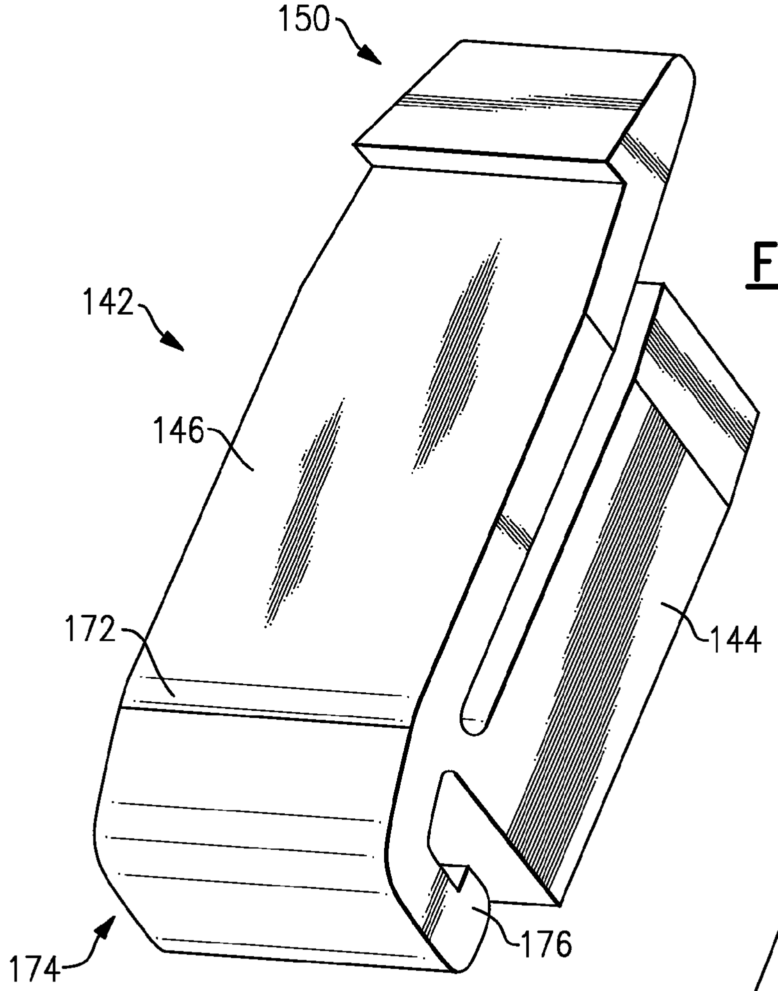
FIG. 8A is a perspective view of another non-limiting embodiment of an anti-rotation key of the disclosed anti-rotation key.
Figure 8B:
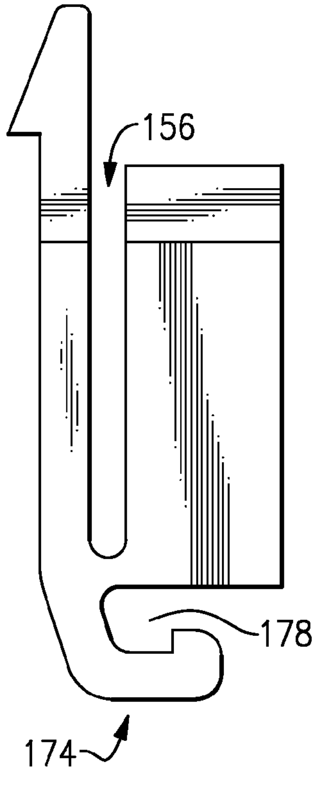
FIG. 8B is a side view of the anti-rotation key of FIG. 8A.

Turning now to FIGS. 8A-8B, the example anti-rotation key 142 includes a main body portion 144 and a flex arm 146 spaced therefrom by a fulcrum 172. At one location, the flex arm 146 includes a locking tip 150, and opposite thereof is a retrieval hook 174, which includes a retrieval pawl 176. The retrieval pawl 176 may generally engage a removal tool 170 (e.g., as shown in FIGS. 9A-9B), which may be received in the space 178 defined by the hook 174.

Figure 9B:
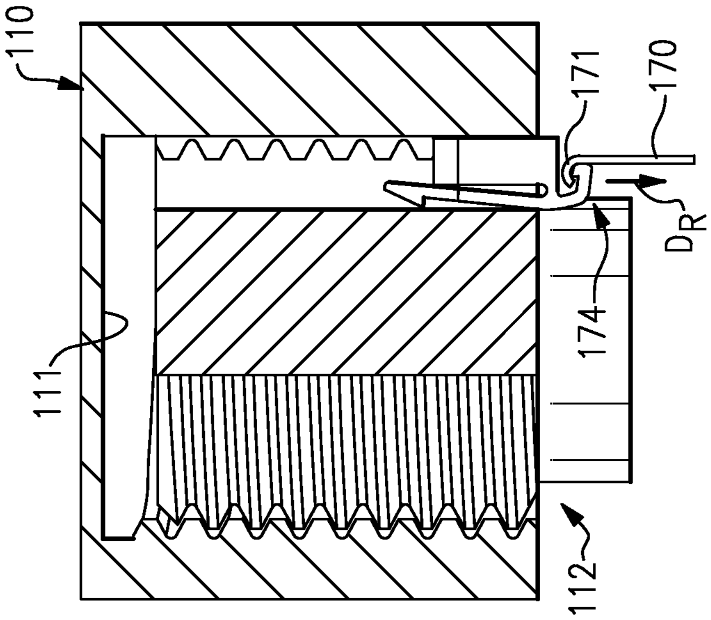
FIGS. 9A-9B are representative of the manner in which the anti-rotation key of FIGS. 8A-8E may be removed from the key channel.
Figure 9A:
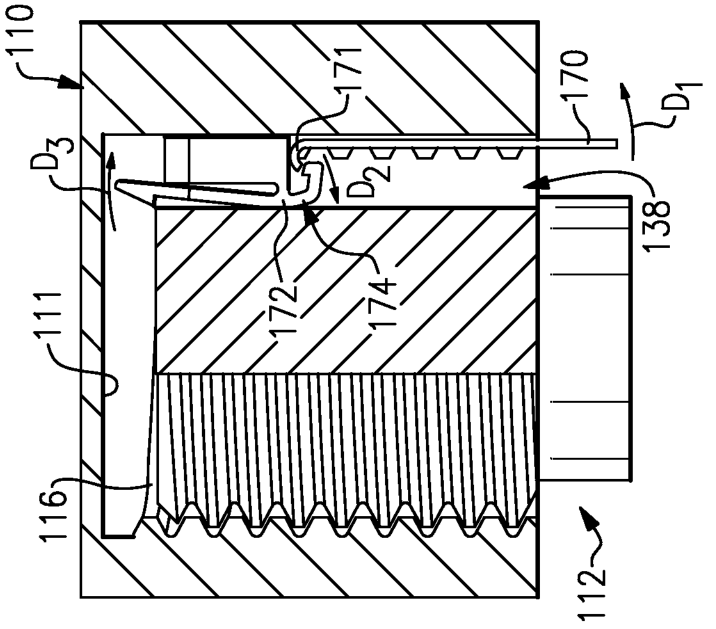

FIGS. 9A-9B are representative of the manner in which the anti-rotation key 142 may be removed from the channel 138, which is formed partially by the stud 112 and housing 110. As shown, the threaded opening 116 in the housing 110 is a blind opening (e.g., by way of the surface 111). Therefore, it may be difficult for a removal tool (e.g., like the removal tool 70 in FIG. 7B) to be inserted from the top of the opening 116 (relative to FIGS. 7A-7B).

The anti-rotation key 142 may be generally inserted as shown in FIGS. 6A-6C. Once inserted, the removal tool 170 may generally be rotated in a direction $D_1$ such that its hook 171 pivots relative to the anti-rotation key 142 and engages the retrieval hook 174 to essentially deflect the retrieval hook 174 in a direction $D_2$ relative to the fulcrum 172. This deflection of the retrieval hook 174 translates into deflection of the locking tip 150 in a direction $D_3$, which disengages the locking tip 150 from the stud 112 in a manner similar to FIG. 7A. The hook 171 of the removal tool 170 can thus be used to pull the anti-rotation key 142 out of the channel 138 in a removal direction $D_R$, as shown in FIG. 9B.

While the above studs (e.g., the studs 12) has been describe as having a first threaded end 14 to be received in the threaded opening 16 of the housing 10, it could be the case that the first threaded end 14 does not include threads, and is instead press fit into an opening (similar to the opening 16, except excluding threads). Further, while the locking tip (e.g., the locking tip 50) is shown as engaging the end face 68 of the stud 12 to retain the anti-rotation key 42 in the channel 38, a cavity, or similar feature, could be associated with the channel 38 to receive the locking tip 50. In this regard, the locking tip 50 need not be positioned at the distal end of the anti-rotation key 42, as shown in the Figures, and it may be positioned at another location along the length of the flex arm 46, say.

Further, and as generally mentioned, the anti-rotation key 42 may be formed of steel or any other suitable material. The disclosed studs and housing may also be formed of steel, for example, and depending on application.

Although it was mentioned above that this disclosure may be useful within a rocket engine, the disclosed anti-rotation key may be useful in other applications, including within bicycles, automobiles and in various other construction applications.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Further, although particular step sequences are shown, described, and claimed, it should be understood that steps may be performed in any order, separated or combined unless otherwise indicated and will still benefit from the present disclosure.

One of ordinary skill in this art would recognize that certain modifications of the instant disclosure would come within the scope of the claims. Accordingly, the following claims should be studied to determine their true scope and content.

What is claimed is:

1. A fastener assembly comprising:

a housing including an opening;

a stud at least partially disposed in the opening, the stud including a channel aligned with the opening; and a key disposed at least partially in both the channel and the opening, the key including a self-retaining feature, wherein the opening includes a channel, the channel of the opening aligned with the channel of the stud, wherein the key includes a main body portion positioned to contact the channels of both of the opening and the stud, wherein the self-retaining feature includes a flex arm extending from the main body portion and a locking tip positioned at an end of the flex arm, wherein the locking tip defines an abutting face, the abutting face contacting an end of the stud, wherein the abutting face defines a plane generally perpendicular to the flex arm.

2. The assembly as recited in claim 1, wherein the locking tip includes an angled surface adjacent the abutting face.

* * * * *